United States Patent
Montilepre

(10) Patent No.: US 11,383,356 B1
(45) Date of Patent: Jul. 12, 2022

(54) SYSTEM AND METHOD FOR EASY ROTATIONAL JEWELRY METAL CLAMP

(71) Applicant: Dennis J. Montilepre, Phelan, CA (US)

(72) Inventor: Dennis J. Montilepre, Phelan, CA (US)

(*) Notice: Subject to any disclaimer, the term of this patent is extended or adjusted under 35 U.S.C. 154(b) by 0 days.

(21) Appl. No.: 17/563,958

(22) Filed: Dec. 28, 2021

Related U.S. Application Data

(60) Provisional application No. 63/150,054, filed on Feb. 16, 2021.

(51) Int. Cl.
  *B25B 5/04* (2006.01)
  *B25B 5/10* (2006.01)
  *B21D 53/44* (2006.01)

(52) U.S. Cl.
  CPC .......... *B25B 5/04* (2013.01); *B25B 5/109* (2013.01); *B21D 53/44* (2013.01)

(58) Field of Classification Search
  CPC .......... B25B 5/04; B25B 5/006; B25B 5/166; B25B 5/109; B23Q 16/04; B23Q 16/06; B23Q 16/08; B23Q 1/265; B23Q 1/50; B23Q 1/52; B23Q 1/22; B23Q 1/527
  USPC .............. 269/45, 71, 81, 210, 287, 203
  See application file for complete search history.

(56) References Cited

U.S. PATENT DOCUMENTS

| | | | |
|---|---|---|---|
| 1,767,220 A | 4/1876 | Wilcox | |
| 1,046,818 A | 12/1912 | Lux | |
| 2,565,999 A | 8/1951 | Teglas et al. | |
| 2,660,079 A | 11/1953 | Bellows | |
| 3,633,444 A * | 1/1972 | Freiburghaus | G04D 1/10 81/6 |
| 4,171,800 A | 10/1979 | Weaver | |
| 4,432,538 A * | 2/1984 | Sequin | B25B 5/08 269/92 |
| 4,549,727 A * | 10/1985 | Kozar | B23Q 16/04 269/93 |
| 4,698,475 A | 10/1987 | Lothenbach et al. | |
| 4,744,552 A | 5/1988 | Glaser | |
| 5,577,717 A | 11/1996 | Benson | |
| 7,300,043 B1 | 11/2007 | Lindsay et al. | |
| 8,512,920 B2 | 8/2013 | Wang et al. | |
| 9,770,078 B1 | 9/2017 | Chiles | |
| 2020/0361075 A1 | 11/2020 | Lewis et al. | |
| 2021/0031333 A1 | 2/2021 | Hutchinson et al. | |

FOREIGN PATENT DOCUMENTS

EP  0335126 A2  4/1989

OTHER PUBLICATIONS

Multipurpose Vise, www.gesswein.com. https://www.gesswein.com/p-10317-multipurpose-vise.aspx [Date accessed: Oct. 15, 2021].

\* cited by examiner

*Primary Examiner* — Orlando E Aviles
*Assistant Examiner* — Thomas Raymond Rodgers
(74) *Attorney, Agent, or Firm* — Christopher Mayle; Bold IP, PLLC

(57) ABSTRACT

A system and method for a clamp designed for those with weak hands or damaged grip this clamp fixes material in place without having to hold with any pinching forces with a top clamp, a bottom clamp, a bearing positioned in a bearing holder, a lock ring, and an anchoring plate positioned below the bearing holder that allows the clamp to be mounted to a bench or other surface.

10 Claims, 6 Drawing Sheets

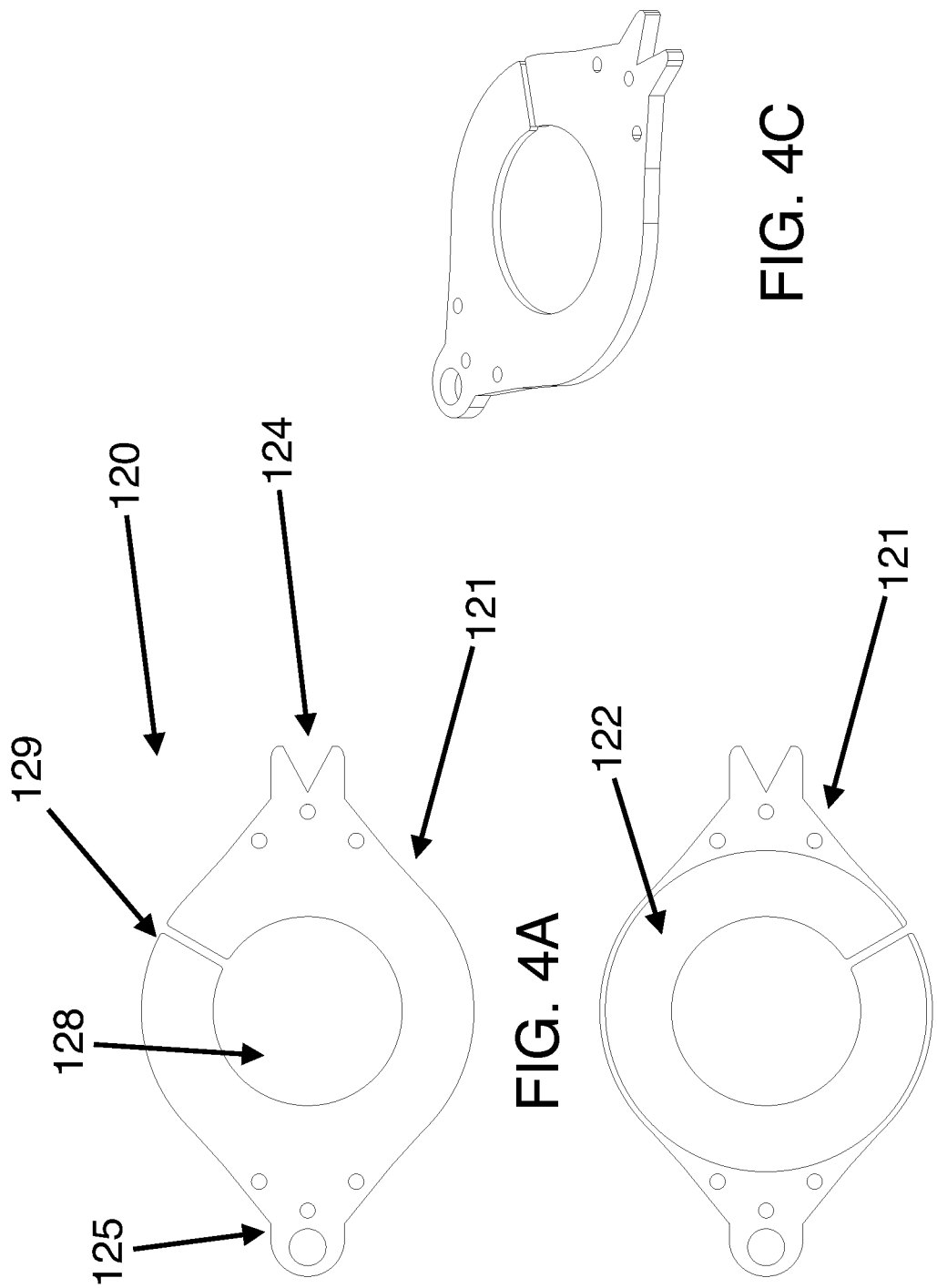

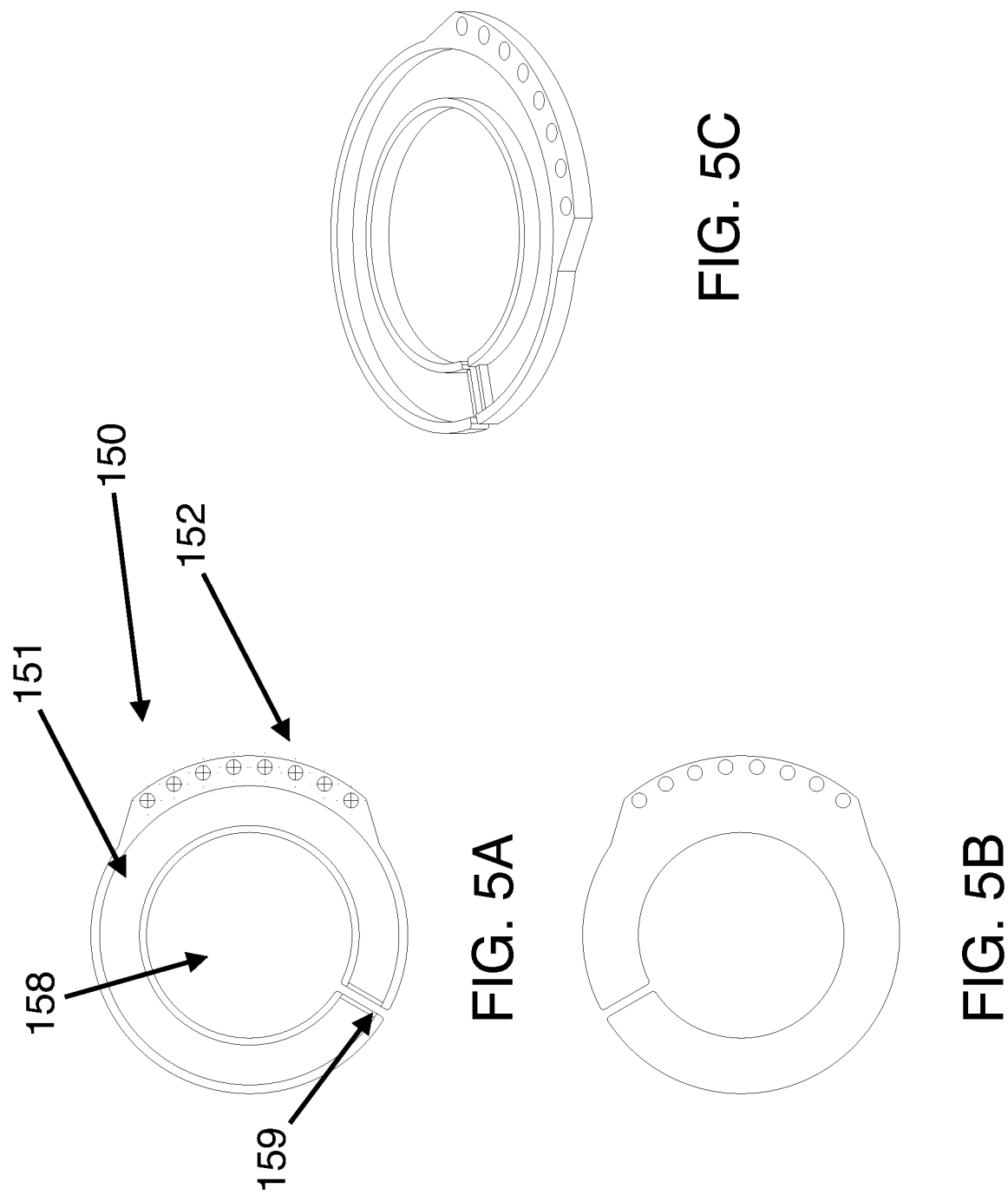

SYSTEM AND METHOD FOR EASY ROTATIONAL JEWELRY METAL CLAMP

CROSS REFERENCE TO RELATED APPLICATIONS

This application is a non-provisional application which claims priority to U.S. Provisional Application No. 63/150,054 filed on Feb. 16, 2021, which is incorporated by reference in its entirety.

FIELD OF DISCLOSURE

The overall field of this invention is a system and method for a clamp and more particularly for a clamp for holding sheet metal jewelry securely to reduce the skill needed to make professional cuts.

BACKGROUND

Custom jewelry making and repair work requires exacting and meticulous attention to detail, particularly during soldering operations with sheet metal. Jewelers need to use both hands to handle a torch and as well as the shaping tools, etc. A clamp is extremely helpful in holding a ring or other jewelry. A clamp increases efficiency and accuracy of cuts made to desired material but previous attempts are not reliable for the holder for the jewelry item on which they are working and are not designed for those with weak hands or damaged grip this clamp fixes material in place without having to hold with any pinching forces. Thus exists the need for a new and improved system and method for an easy rotational jewelry metal clamp.

SUMMARY

The embodiments of the present invention are directed to a clamping device, the clamping device including a top clamp, a bottom clamp positioned below the top clamp, a bearing positioned below the bottom clamp, and a bearing holder positioned below the bearing facilitating rotation of the top clamp, the bottom clamp, and the bearing holder, an anchoring plate positioned below the bearing holder and fixedly attached to the bearing holder wherein the anchoring plate is mountable to a fixture mount, a lock ring attached to a bottom the bottom clamp, the bottom clamp having a lower portion extending past the bearing holder and the anchoring plate, the clamping device having a hollow interior consistent among the top clamp, the bottom clamp, the bearing, the bearing holder, the anchoring plate, and the lock ring, the clamping device having an access slot between the hollow interior and an outside, the access slot being consistent among the top clamp, the bottom clamp, the bearing, the bearing holder, the anchoring plate, and the lock ring.

BRIEF DESCRIPTION OF DRAWINGS

The present invention will be described by way of exemplary embodiments, but not limitations, illustrated in the accompanying drawings in which like references denote similar elements, and in which:

FIG. 4A-4C are an illustration of the bottom clamping component.

FIG. 5A-5C are an illustration of the bearing and bearing holder.

DETAILED DESCRIPTION

Figure 1:
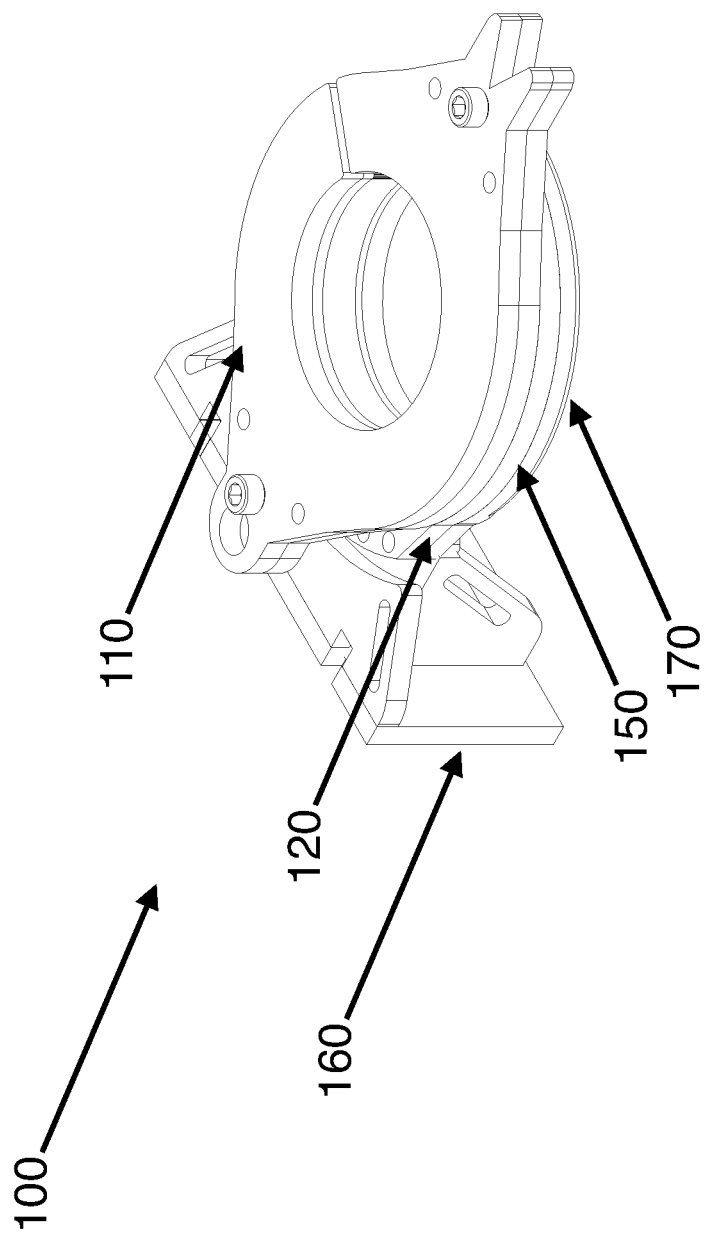
FIG. 1 is a perspective view of the clamp in accordance with the present invention.

In the Summary above and in this Detailed Description, and the claims below, and in the accompanying drawings, reference is made to particular features of the invention. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skill in the art that the invention may be practiced without these specific details. In other instances, well-known features have not been described in detail to avoid unnecessarily complicating the description.

The present disclosure recognizes the unsolved need for an improved system and method for a clamp for holding sheet metal jewelry securely to reduce the skill needed to make professional cuts. Turning to FIG. 1, FIG. 1 depicts an illustration of the present invention for clamping device 100. FIG. 7 depicts an exploded view. Clamping device 100 has a top clamping component 110 and a bottom clamping component 120 whereby when in use clamping device 100 clamps onto material between top clamping component 110 and bottom clamping component 120 whereby one or more bolts are used to tighten down top clamping component 110 to bottom clamping component 120 with pressure. Top clamping component 110 experiences the most stress as the bolts are tightened to clamp material. Top clamping component 110, in one preferred embodiment, may be made from a ¼" aluminum plate and hold whatever material is positioned between top clamping component 110 and bottom clamping component 120 from the top.

Figure 2:
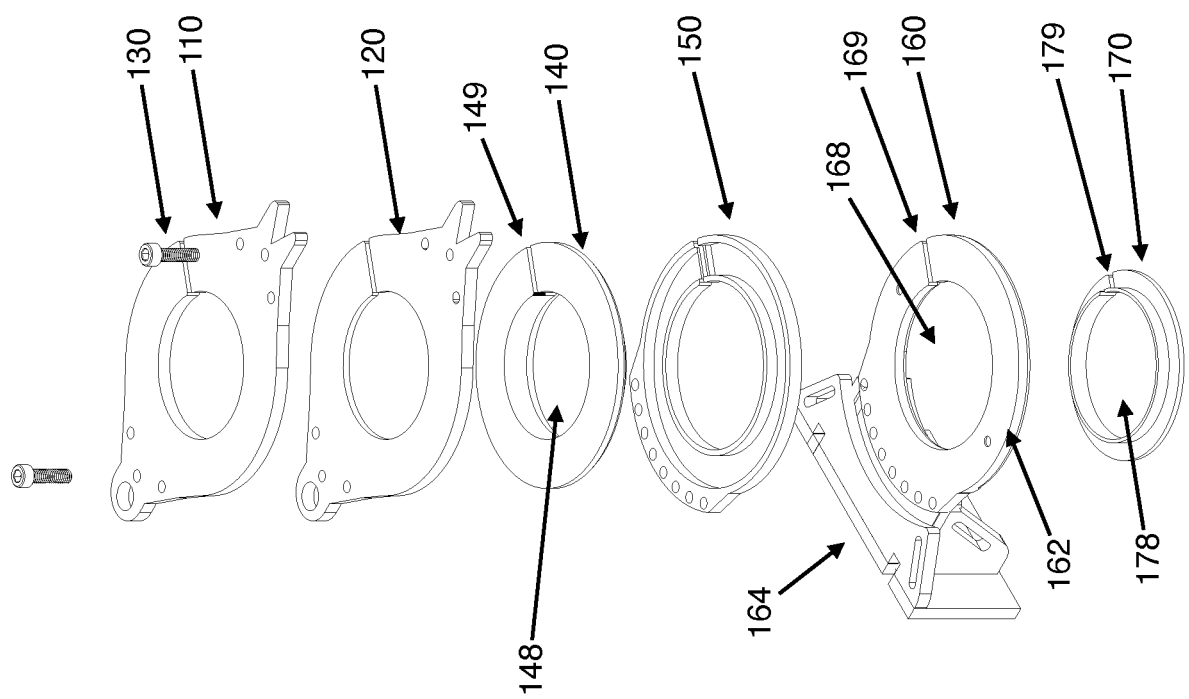
FIG. 2 is an illustration of an exploded view of clamp assembly.

Top clamping component 110, as illustrated in FIG. 2, may have an eye shape with a hollow ring portion 111 with an inner diameter 118. In one or more embodiments ring portion 111 may not be a fully complete circle with an access slot 119 formed through the exterior of ring portion 111 to inner diameter 118. Top clamping component 110 has a first protrusion 112 and second protrusion 113 projecting outward from either side of ring portion 111. First protrusion 112 and second protrusion 113 are designed to hold smaller objects such as a coin or other smaller items. First protrusion 112 may have two parallel segments that extend outward from ring portion 111 and end at two angled pointing line segments that are connected by an inward pointing v shaped segment. First protrusion 112 and second protrusion 113 each have a ¼ inch hole to receive one or more fasteners which are smaller than the aperture on second protrusion 113.

Figure 3C:
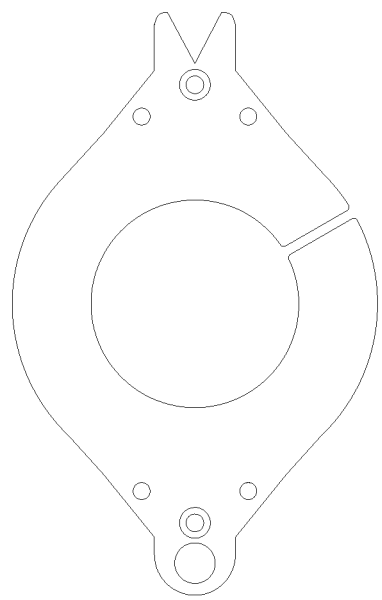
FIG. 3A-3C are an illustration of the top clamping component.
Figure 3A:
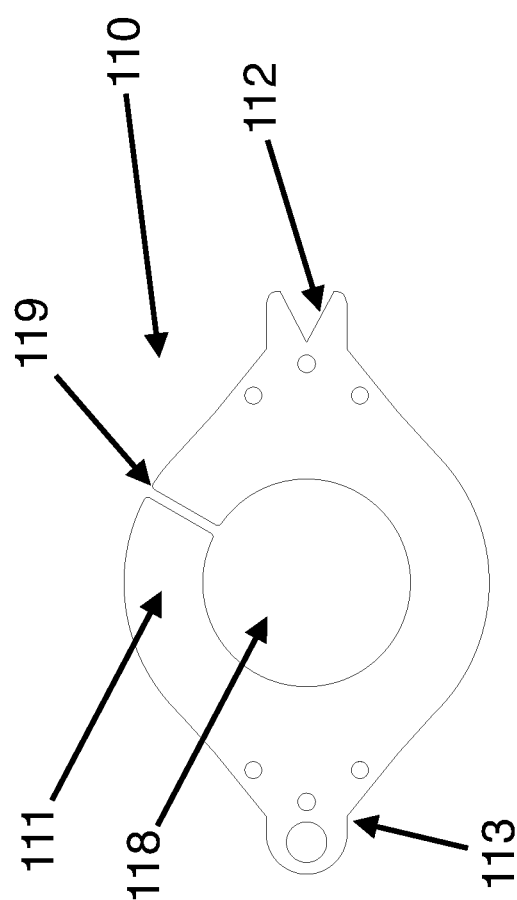
Figure 3B:
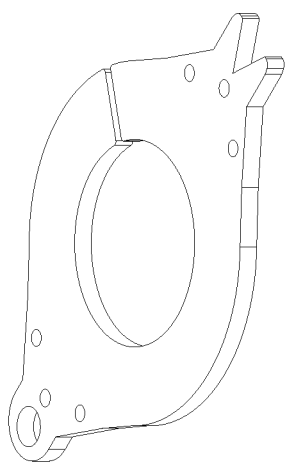

Bottom clamping component 120, as illustrated in FIG. 3, may be of a similar or same area as top clamping component 110. Bottom clamping component 120, in one non-limiting preferred embodiment, may be made from a ¼" aluminum plate. Bottom clamping component 120 may have an upper component 121 and a lower component 122 whereby lower component 122 is of less area and perimeter than upper component 121. Bottom clamping component 120 may have an inner diameter 128 that is aligned and of the same size as inner diameter 118. Upper component 121 may have an eye shape with a circular inner portion 123 and first protrusion 124 and second protrusion 125 projecting from circular inner portion 123. First protrusion 124 may have two parallel segments that outward extend from circular inner portion 123 and end at two angled pointing line segments that are connected by an inward pointing v shaped segment. Second protrusion 113 may have an aperture. Circular inner portion 123 may not be a fully complete ring with an access slot 129 formed through the exterior of bottom clamping component 120 to inner diameter 128 that is aligned with access slot 119 in top clamping component 110.

The holes in first protrusion 112 and second protrusion 113 and first protrusion 124 and second protrusion 125 may be designed for receiving one or more fasteners 130 to decrease the length between top clamping component 110 and bottom clamping component 120. Fasteners 130 may be any type of fasteners known in the art, including, but not limited to, any type of screw and/or nut and bolt combination. In one preferred embodiment, fasteners 130 may be ¼-20×1 ¼" Allen head bolts. One or more springs 132 may be positioned around fasteners 130 between bottom clamping component 120 and top clamping component 110 in or to facilitate keeping top clamping component 110 separate from bottom clamping component 120 when loosened. This helps increase ease of removing material once manipulated in a desired fashion.

Figure 6:
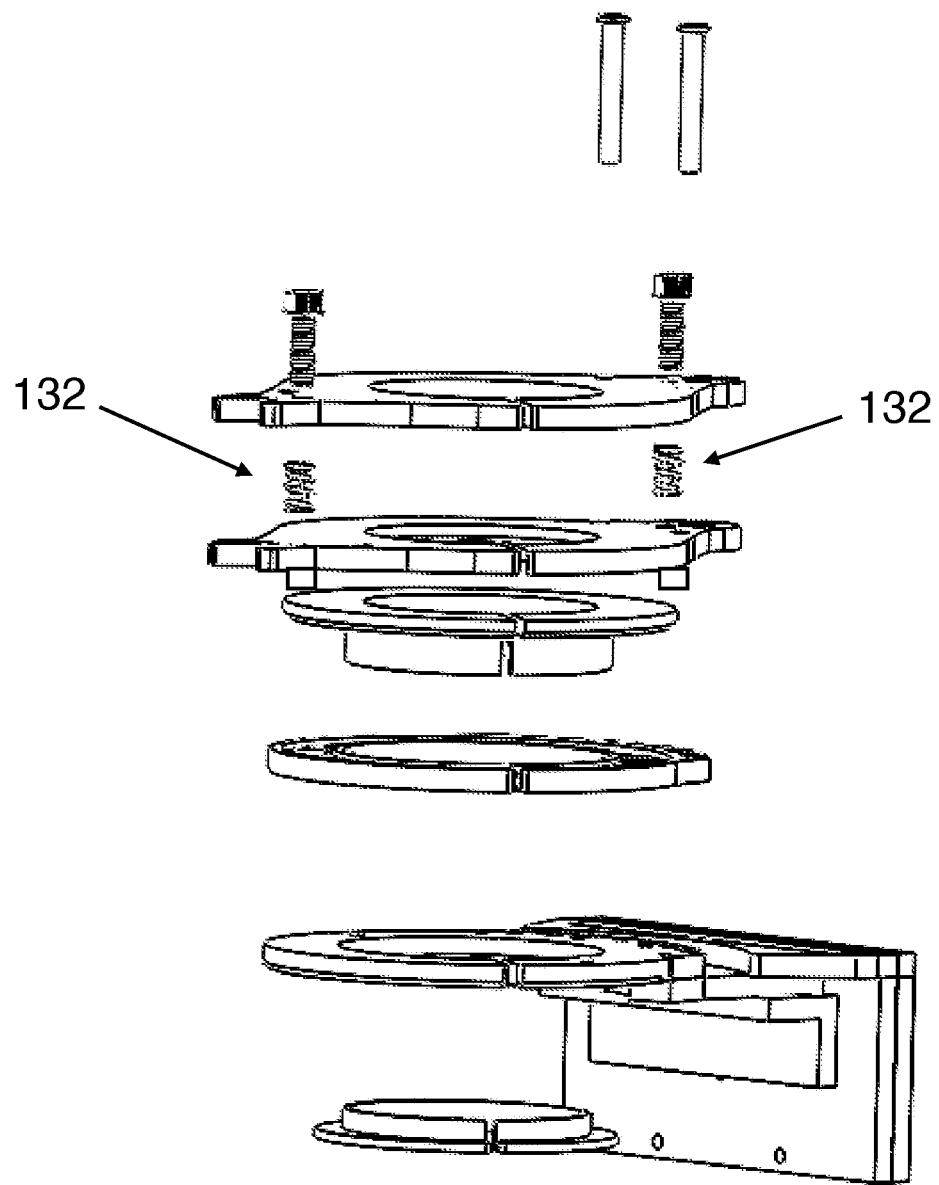
FIG. 6 is an illustration of another exploded view of the clamp assembly.

Fasteners 130 may have a knob 134 for screwing and unscrewing fasteners 130. When knob 134 is unscrewed to release pressure, springs 132 separate top clamping component 110 and bottom clamping component 120 to ease removal of the material, as illustrated in FIG. 6. Top clamping component 110 may have a housing on the bottom surface of top clamping component 110 acting as a receptacle for springs 132 such that clamping device 100 may close completely without resistance from the compressed length of springs 132. One or more pieces of rubber cut to shape may be placed on the bottom surface of top clamping component 110 and the top surface of bottom clamping component 120. The rubber helps increase friction on material being clamped to reduce movement as changes to materials are made.

Lower component 122 of bottom clamping component 120 dictates the diameter of the cutting area. The bottom side of lower component 122 has a slightly extruded ring in order to sit on top of a bearing helping create a tolerance for smooth rotation. The bottom surface of the lower component 122 also houses the flush nuts in one or more receptacles or cavities which create the clamping force with the help of knobs 134. Two smaller holes may be positioned on each of first protrusion 124 and second protrusion 125 of bottom clamping component 120 that may be used for one or more fasteners to lock rotation when needed.

Bottom clamping component 120 may be mounted on a ring shaped bearing 140 as illustrated in FIG. 4, which allows rotation based off an axis in the center of the cutting area thus providing smooth rotation of material being clamped between top clamping component 110 and bottom clamping component 120. The design of clamping device 100 allows for different bearing 140 sizes. Bearing 140 may have a ring shape with an inner diameter 148 that is aligned with inner diameter 118 and inner diameter 128. Bearing 140 may not be a full ring and have an access slot 149 aligned with the access slot 119 and access slot 129. Bearing 140 may be held within a bearing holder 150. Bearing holder 150 may be made from a ¼ inch aluminum plate and have a ring shaped cavity 151 for holding bearing 103. Ring shaped cavity 151 may have a ring shape with an inner diameter 158 that is aligned with inner diameter 118, inner diameter 128, and inner diameter 148. Ring shaped cavity 151 may not have a full ring shaped cavity and have an access slot 159 aligned with the access slot 119, access slot 129, and access slot 149. A washer may be placed on the top surface of bearing holder 150 while assembling to reduce friction gaining smoother and faster rotation. Bearing holder 150 may have eight holes on a perimeter protrusion 152 which may be used to lead pins that lock rotation into anchoring plate 160 from bottom clamping component 120.

Bearing holder 150 may be fixed in place with the use of metal pins and epoxy to anchoring plate 160. Anchoring plate 160, as illustrated in FIG. 5, holds the work product one inch above bench height when mounted to a bench as intended. Anchor plate 160 is designed to hold all other parts of clamping device 100 to a desired surface and resists stress as clamped material is altered. Anchoring plate 160 may have a ring shaped component 162 with an inner diameter 168 aligned with inner diameter 118, inner diameter 128, inner diameter 148, and inner diameter 158. Ring shaped component 162 may not be a full ring and have an access slot 169 aligned with access slot 119, access slot 129, access slot 149, and access slot 159. Ring shaped component 162 may be connected to a mounting component 164 with a trapezoid shape with a semicircular surface that is shared with ring shaped component 162.

Anchoring plate 160 may be fastened to the bench by any number of fasteners known by those of ordinary skill in the art such as but not limited to screws, latches, hinges, or adhesive. It may be a commonly used mount such that clamping device 100 may quickly be changed out with other tools if desired. Anchoring plate 160 may have eight holes on a perimeter protrusion 165 which may be used to lead pins that lock rotation of bottom clamping component 120. One or more pins may be positioned through the holes in bottom clamping component 120, bearing holder 150, and anchoring plate 160 to lock rotation of the bearing 140 and clamping device 100 itself. One or more pins may be used to align bearing holder 150 and anchoring plate 160 upon assembly. In one preferred non-limiting embodiment pins may be 3/16" square pins.

A lock ring 170, as illustrated in FIG. 6, may be fixed upon assembly with epoxy on the bottom surface of bottom clamping component 120 once lower component 122 is positioned past bearing holder 150 and anchoring plate 160. Lock ring 170 may be created in one or more non-limiting embodiments from a 3D-printer out of polycarbonate material. The purpose of lock ring 170 is to simplify bottom clamping component 120 for faster and manufacturability while keeping strength where needed as well as ensure that bottom clamping component 120 does not separate from anchoring plate 160. Lock ring 170 may have a ring shape with an inner diameter 178 that is aligned with inner diameter 118, inner diameter 128, inner diameter 148, inner diameter 158, and inner diameter 168. Lock ring 170 may not be a full ring and have an access slot 179 aligned with the access slot 119, access slot 129, access slot 149, access slot 159, and access slot 169.

One or more washers may be used to limit the hollow space within clamping device 100 such that clamping device 100 may clamp onto smaller material. Washers may be polycarbonate hollow washers of different sizes. The solid washers provide the ability to customize shape and size of the hole within clamping device 100 by cutting out any shape desired. For example, a clamp with a 3" cutting area may still clamp a ½" coin or center with the included washers.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated.

What is claimed is:

1. A clamping device, the clamping device comprising:
    a top clamp;
    a bottom clamp positioned below the top clamp, wherein a material is clampable between the top clamp and the bottom clamp;
    one or more fasteners;
    the top clamp and the bottom clamp having one or more receiving holes for the one or more fasteners;
    a bearing positioned below the bottom clamp;
    a bearing holder positioned below the bearing facilitating rotation of the top clamp, the bottom clamp, and the bearing;
    a lock element attached to a bottom of the bottom clamp; and
    an anchoring plate positioned below the bearing holder and fixedly attached to the bearing holder, wherein the top clamp, the bottom clamp, the bearing, the bearing holder, the anchoring plate, and the lock element, have an aperture therethrough at a center, wherein the apertures are aligned with one another, wherein the top clamp, the bottom clamp, the bearing, the bearing holder, the anchoring plate, and the lock element each have a slot shaped aperture that connects from a top surface to a bottom surface, wherein the slot shaped apertures are aligned and extend from a perimeter to the center, wherein the slot shaped apertures are unobstructed from the top or the bottom of the clamping device.

2. The clamping device of claim 1, the clamping device having a first protrusion at a first area of the perimeter of the top clamp, the bottom clamp, the bearing holder, the anchoring plate, and the lock element with a hole therethrough that is unobstructed from the top or the bottom of the clamping device.

3. The clamping device of claim 2, the clamping device having a second protrusion at a second area of the perimeter of the top clamp, the bottom clamp, the bearing holder, the anchoring plate, and the lock element, wherein the second area is across from the first area, wherein the second protrusion has second set of parallel segments that extend outward and end at two angled pointing line segments that are connected by an inward pointing v shaped segment configured to hold objects between the two angled pointing line segments.

4. The clamping device of claim 1, further comprising one or more springs around each of the one or more fasteners between the top clamp and the bottom clamp.

5. The clamping device of claim 1, wherein the top clamp has an eye shape with a circular center extending outward in a lateral direction into two protrusions on opposite sides that extend further outward in the lateral direction.

6. The clamping device of claim 5, wherein the bottom clamp has an eye shape with a circular center extending outward in the lateral direction into the two protrusions on opposite sides that extend further outward in the lateral direction.

7. The clamping device of claim 6 wherein the bearing, bearing holder, a locking plate have a circular shape.

8. The clamping device of claim 1, further comprising one or more washers to limit a hollow space between the clamping device.

9. The clamping device of claim 1, further comprising a washer positioned above the bearing holder.

10. The clamping device of claim 1, wherein the anchoring plate is mountable to a fixture mount.

* * * * *